United States Patent [19]
Baehler

[11] Patent Number: 6,016,739
[45] Date of Patent: Jan. 25, 2000

[54] PISTON AND METHOD FOR REDUCING WEAR

[75] Inventor: Thomas W. Baehler, Rockford, Ill.

[73] Assignee: Sundstrand Corporation, Rockford, Ill.

[21] Appl. No.: 08/484,729

[22] Filed: Jun. 7, 1995

[51] Int. Cl.$^7$ .................................................. F16J 1/00
[52] U.S. Cl. ................................................ 92/172; 92/71
[58] Field of Search ........................... 92/172, 208, 12.2, 92/71, 57

[56] References Cited

U.S. PATENT DOCUMENTS

| | | |
|---|---|---|
| 1,228,048 | 5/1917 | Rich . |
| 2,662,515 | 12/1953 | Bodine, Jr. ................................. 92/208 |
| 2,966,145 | 12/1960 | Froehlich . |
| 3,319,575 | 5/1967 | Havens . |
| 3,382,857 | 5/1968 | Foster et al. . |
| 3,592,105 | 7/1971 | Fryklund ................................... 92/172 |
| 3,643,637 | 2/1972 | Strossner et al. . |
| 3,915,141 | 10/1975 | Ottl et al. . |
| 4,016,850 | 4/1977 | Bloemers . |
| 4,161,165 | 7/1979 | Belush et al. . |
| 4,191,156 | 3/1980 | Doveri . |
| 4,297,983 | 11/1981 | Ward . |
| 4,614,185 | 9/1986 | Fox . |
| 4,694,735 | 9/1987 | Tatematsu et al. . |
| 4,798,182 | 1/1989 | Ebinuma et al. . |
| 4,951,621 | 8/1990 | Tomita et al. . |
| 5,076,148 | 12/1991 | Adler . |

FOREIGN PATENT DOCUMENTS

| | | | |
|---|---|---|---|
| 1123901 | 10/1956 | France ...................................... | 92/172 |

*Primary Examiner*—Thomas E. Denion
*Attorney, Agent, or Firm*—Kristin L. Chapman

[57] ABSTRACT

This invention relates to a piston for reciprocating and simultaneously rotating through a predetermined length of movement within a piston bore having a piston bore surface, and a method for reducing wear on a piston bore surface operatively associated with a piston which is subject to cocking forces. The piston includes a means on its extreme portion for providing continuous, tangential cooperation with the piston bore surface within the predetermined length of piston movement to reduce wear on the piston bore surface.

2 Claims, 3 Drawing Sheets

PISTON AND METHOD FOR REDUCING WEAR

FIELD OF THE INVENTION

This invention relates to hydraulic pumps and motors as well as like devices where pistons reciprocate and simultaneously rotate within a piston bore.

BACKGROUND OF THE INVENTION

Pistons adapted for use in axial piston pumps and motors as in the aerospace industry are often subject to significant stress concentration levels. That stress typically arises because the pistons reciprocate at high velocities and simultaneously rotate in relation to piston bores. In certain applications, such as an aircraft integrated drive generator (IDG), the relationship of each piston to its respective piston bore within the cylinder block should be controlled within a tight diametral clearance range, such as 0.0001" to 0.0004". In such arrangements, oil is pumped into and out of the piston bore at up to approximately 6000 psi. Each cylinder block of the IDG typically contains nine pistons, and each IDG typically contains four cylinder blocks per aircraft engine. Thus, to increase service reliability of the aircraft and reduce periodic maintenance, it is desirable to minimize wear of the pistons on associated cylinder block bores.

In order to withstand harsh, aircraft operating environments without requiring excess weight, previous pistons have been constructed from a strong, wear resistant material, such as steel, with a hollowed section. One example is disclosed by Havens in U.S. Pat. No. 3,319,575. However, the Havens patent design does not adequately account for certain problems of wear on the piston bore surface caused by "cocking" of the piston. This arises where external forces applied to the piston cause the piston to move laterally against the piston bore, despite the presence of lubricating oil within the piston bore and the use of a copper-based alloy bushing or liner for the piston bore surface.

Cocking can present significant problems because stress concentrations increase where the piston is rubbing against the piston bore surface. This causes the piston to gradually wear away at the piston bore surface and eliminate the performance-based tight tolerance. Often, this can leave a wear path in a range of 0.012"–0.020" deep with the worn material contaminating the lubricating oil. Such extra clearance in the piston bore triggers excess fluid leakage in the cylinder block and piston assembly which can result in low charge pressure and prevent electrical performance frequency ratings of the IDG from being reached. Eventually the wear can cause the hydraulic unit to completely malfunction.

An additional problem resulting from low charge pressure is cavitation. Cavitation results from the rapid formation and collapse of vapor pockets in a flowing liquid in regions of very low pressure. Cavitation also appears to have a detrimental effect on piston bore wear; although, the correlation between cavitation and piston bore wear is not fully understood. However, the present invention attempts to separate this relationship between piston bore wear and piston bore cavitation damage.

Accordingly, objects of the present invention include providing an improved method for reducing wear on a piston bore surface caused by external forces acting on a piston, and an advanced piston design and a cylinder block assembly incorporating the advanced piston design which has advantageous wear reduction characteristics. Other objects of the invention include the following:

(i) to maximize efficiency of the piston design with an improved geometry for allowing oil to lubricate the piston bore surface;

(ii) to maximize efficiency of the cylinder block assembly design;

(iii) to reduce contact stress concentration between the piston and the piston bore surface;

(iv) to prevent cavitation within the piston bore of the cylinder block as the piston operates; and (v) to prevent contamination of lubricating oil caused by worn bushing and piston bore surface material.

SUMMARY OF THE INVENTION

The present invention provides a piston having a means on its extreme portion for providing continuous, tangential cooperation with the piston bore surface within the predetermined length of piston movement to reduce wear on the piston bore surface.

Preferably, the means for providing continuous, tangential cooperation between the extreme portion and the piston bore surface includes an extended curvature on an outer radial surface of the piston. Additionally, the extended curvature extends from a center portion of the outer radial surface and terminates at an end of the piston.

The invention further provides a cylinder block assembly which is rotatably coupled to a shaft for use in a motor or pump. The cylinder block assembly includes a cylinder block having a plurality of piston bores extending through the cylinder block. Each piston bore has a piston bore surface. The cylinder block assembly further includes a wobbler located adjacent to the cylinder block and at least one slipper coupled to the wobbler for providing reciprocating movement of at least one piston through a predetermined length of movement within one of the piston bores of the cylinder block. The cylinder block assembly further includes at least one piston coupled to the slipper for reciprocating and simultaneously rotating through the predetermined length of movement within one of the piston bores of the cylinder block. The piston has at least one extreme portion which includes a means for providing continuous, tangential cooperation between the extreme portion of the piston and the piston bore surface of the cylinder block within the predetermined length of movement to reduce wear on the piston bore surface of the cylinder block. The means for providing continuous, tangential cooperation may include an extended curvature.

The invention also provides a method for reducing wear on a piston bore surface operatively associated with a piston which is subject to cocking forces. The method includes balancing stress concentration over the piston bore surface through applying equal pressure by the piston to the piston bore surface over a length of movement of the piston.

BRIEF DESCRIPTION OF THE DRAWINGS

While the specification concludes with claims particularly pointing out and distinctly claiming that which is regarded as the present invention, the organization, the advantages, and objects of the invention may be readily ascertained by one skilled in the art from the following detailed description when read in conjunction with the accompanying drawings in which:

DESCRIPTION OF PREFERRED EMBODIMENTS

Figure 1:
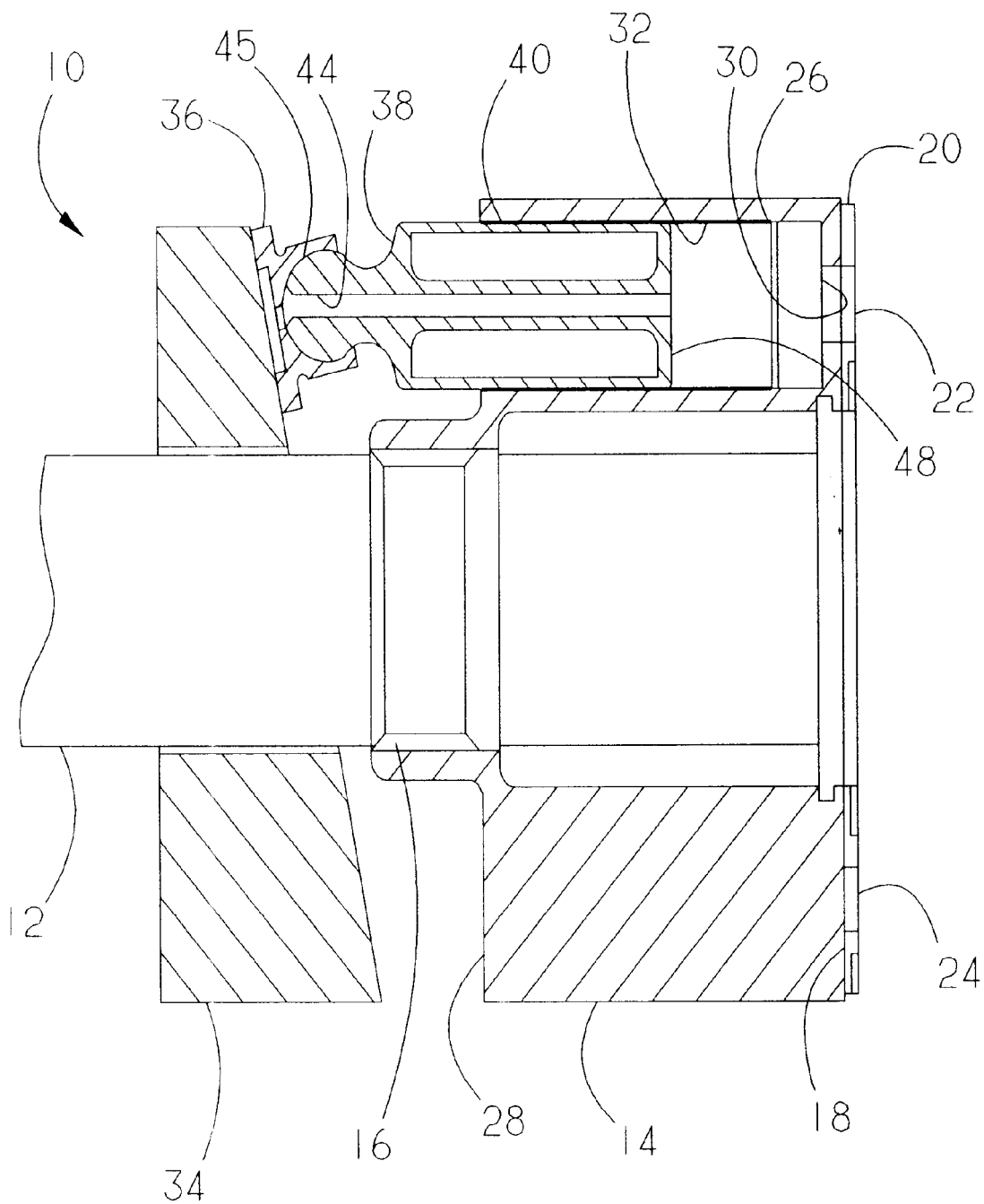
FIG. 1 is a cross-sectional schematic view of a cylinder block assembly in accordance with the instant invention.

FIG. 1 illustrates a cylinder block assembly 10 mounted on a shaft 12. The shaft 12 is rotatable in a coupled relationship for use in a conventional pump or motor (not shown).

The cylinder block assembly 10 includes a cylinder block 14. While the external shape of the block 14 need not be cylindrical in shape, it is typically referred to in the art as a "cylinder". The shaft 12 includes a splined portion 16 which engages respective mating splines on the cylinder block 14, allowing the cylinder block 14 to rotate with the shaft 12 to transmit power to and from the cylinder block assembly 10.

The cylinder block 14 has a first end surface 18 which is attached and sealed by a valve plate 20. The valve plate 20 may be constructed from a wear resistant copper-based alloy such as bronze. The valve plate 20 may be diffusion bonded to the first end surface 18 to rotate with the cylinder block 14 in conjunction with the shaft 12. The valve plate 20 includes a plurality of fluid inlet passages 22 and a plurality of fluid outlet passages 24 formed therein which open to the first end surface 18 of the cylinder block 14.

The cylinder block 14 includes a plurality of axially disposed piston bores 26, although only a single such bore is illustrated in FIG. 1. Each of the piston bores 26 communicates with a corresponding piston bore passage 30 formed in the first end surface 18 and opening to the valve plate 20. Each of the piston bores 26 extend from the piston bore passage 30 to a second end surface 28 of the cylinder block 14. The piston bores 26 are preferably substantially cylindrical in nature, and each includes a piston bore surface 32. Fixedly secured to each piston bore surface 32 within each piston bore 26 is a bushing 40, which is also substantially cylindrical in nature. The bushing is preferably constructed from a wear resistant copper-based alloy such as bronze, and may be secured as an integral portion of the piston bore surface 32 by a diffusion bonding or casting process. The piston bores 26 are typically arranged in an annular array about an axis of rotation of shaft 12. Preferably, nine piston bores are provided in the cylinder block 14 for an integrated drive generator (IDG) unit for use on an aircraft. As the cylinder block 14 rotates with the shaft 12, each piston bore passage 30 serially communicates with the fluid inlet passages 22 or the fluid outlet passages 24 of the valve plate 20, allowing oil to flow through the piston bore passage 30 and into the piston bore 26 to provide hydraulic power and lubrication to the piston bore surface 32.

The cylinder block assembly 10 further works in conjunction with a wobbler 34, preferably of a fixed displacement type as shown, which is located adjacent to the second end surface 28 of the cylinder block 14. Alternatively, a wobbler of a variable angle type may also be employed. The fixed wobbler 34 does not rotate and is coupled to a slipper 36 which is mounted adjacent each piston bore 26 in the cylinder block 14. Thus, if the cylinder block assembly 10 for an aircraft IDG unit preferably includes nine piston bores 26, the wobbler 34 is coupled to a corresponding number of nine slippers 36.

The cylinder block assembly 10 further includes a piston 38. Thus, the exemplary aircraft IDG unit includes nine pistons 38. The pistons 38 are connected to the slippers 36 via a ball and socket joint 45. The piston 38 preferably includes a fluid passage 44 extending the length of the piston 38 for providing lubricating fluid through the piston bore passages 30 to the slipper 36 and the ball and socket joint 45. As the cylinder block 14 rotates with the shaft 12, each piston bore 26 receives the lubricating fluid, such as oil, at high pressure through the fluid inlet passages 22, as each piston bore passage 30 passes over one of the fluid inlet passages 22. Each piston 38 has a first end 48 which receives and delivers the propulsive fluid entering the piston bore 26 to each slipper 36, and subsequently conveys the highly pressurized fluid through the fluid outlet passages 24, as the piston bore passage 30 continues to rotate with the valve plate 20 and pass over the fluid outlet passages 24.

Figure 2:
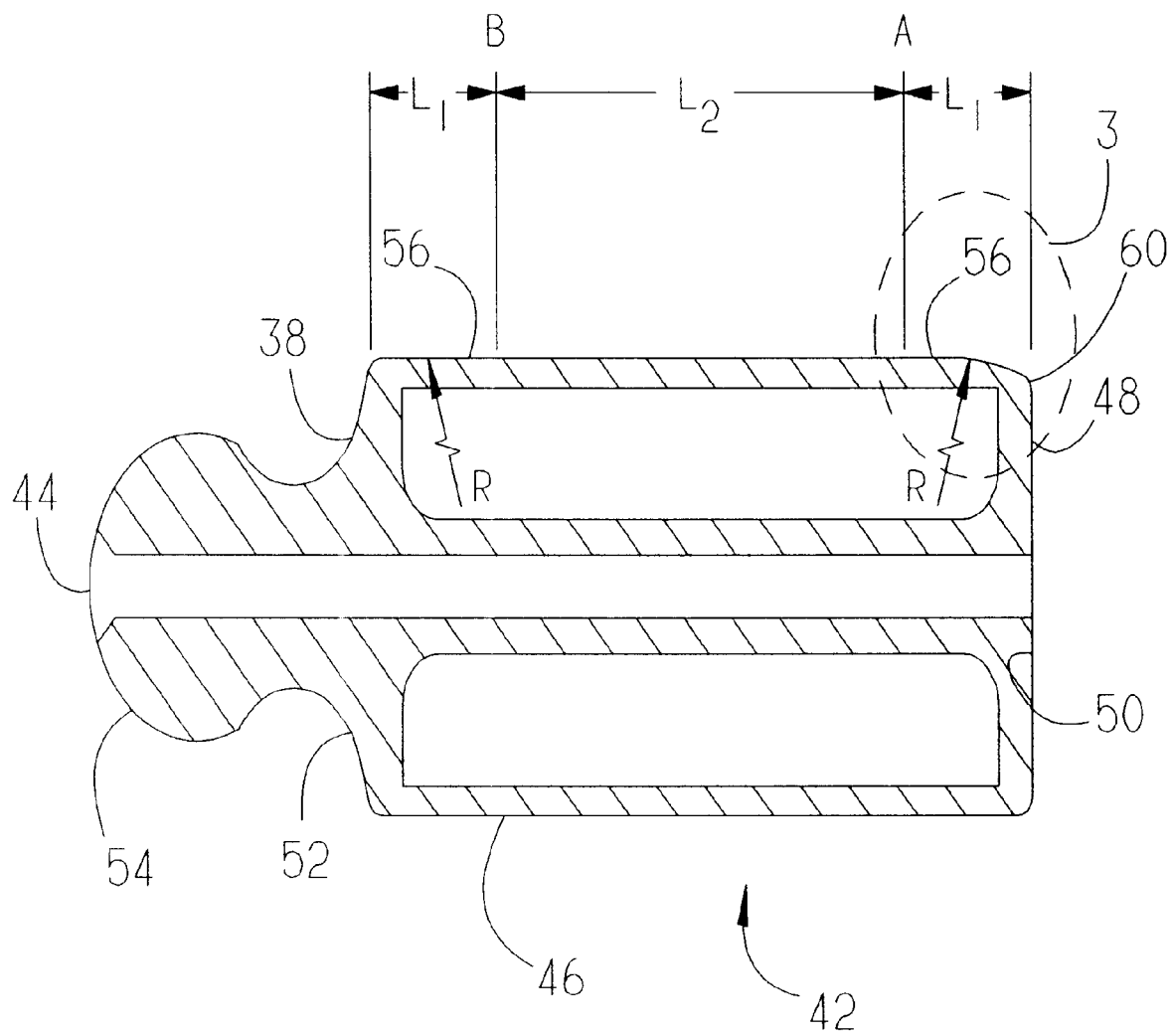
FIG. 2 is a cross-sectional view of the piston of FIG. 1 in accordance with the instant invention.

FIG. 2 illustrates a cross-section of the piston 38 in greater detail. The piston 38 includes a substantially cylindrical member 42 and has an outer radial surface 46 which is defined by an outer diameter of the piston 38. The outer radial surface 46 in substantially parallel to the longitudinal axis of direction within the piston bore 26. This outer radial surface 46 is closely toleranced in size, such that the piston 38 to piston bore 26 diametral clearance is preferably in a range of 0.0001" to 0.0004". The piston bore surface 32 may include the bushing 40 integrally secured as part of the piston bore surface 32. The first end 48 of the piston 38 is preferably defined by a substantially planar surface 50. Where the outer radial surface 46 and the first end 48 meet defines a corner 60 which may be either sharply defined or rounded. The piston 38 further includes a second end 52, which terminates in the form of a substantially spherical projection 54. This projection 54 of the piston 38 is coupled to a mating surface of the slipper 36, preferably via the ball and socket joint 45 (FIG. 1). With this coupled relationship, the slipper 36 and the wobbler 34 are adapted for providing reciprocating movement of the piston within one of the piston bores 26 of the cylinder block 14.

The outer radial surface 46 of the piston 38 preferably includes an extreme portion, generally depicted by $L_1$ in FIG. 2, at both the first end 48 and the second end 52 of the piston 38. As seen in the exploded view of FIG. 3, the extreme portion $L_1$, is substantially convex in nature. The outer radial surface 46 of the piston 38 may further include a center portion, generally depicted by $L_2$, extending a length of the outer radial surface 46 between each extreme portion $L_1$. Thus, it can be seen from FIG. 2, one extreme portion $L_1$ preferably extends from a plane A, marking the termination of the center portion $L_2$ and the beginning of the extreme portion $L_1$, and terminates at the first end 48, while the other extreme portion $L_1$ extends from a plane B and terminates at the second end 52. While FIG. 2 shows an exemplary embodiment of the piston 38, a wide range of dimensional lengths for each extreme portion $L_1$ and the center portion $L_2$ may be utilized in keeping with the spirit of the instant invention without requiring the piston 38 to be lengthened.

Figure 3:
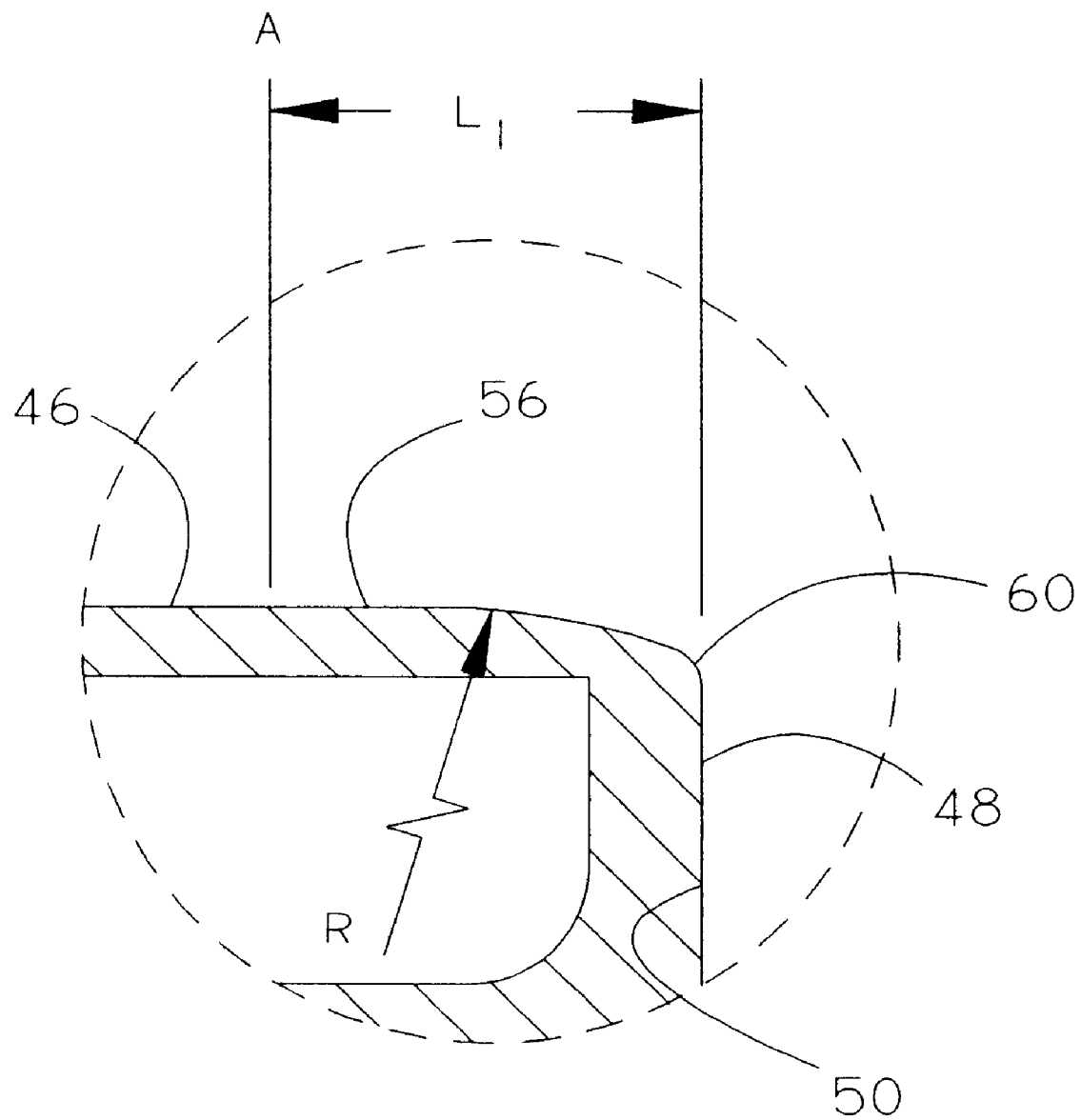
FIG. 3 is an exploded view of the extended curvature of the piston of FIG. 2 in accordance with the instant invention.

As can be viewed in a preferred embodiment of FIG. 3, each extreme portion $L_1$ includes an extended curvature 56. Each extended curvature 56 has a radius R, which preferably begins along plane A and continues through the extreme portion $L_1$ for the first end 48 of the piston 38, and begins along plane B and continues through the extreme portion $L_1$ for the second end 52 of the piston 38. Each extended curvature may be manufactured using a centerless grinding type of process, which creates the extended curvature 56 without a distinct interruption in surface contour of the outer radial surface 46 of the piston 38.

Referring again to FIG. 1, the simultaneous reciprocating and rotating motion of the piston 38 may be appreciated. The piston 38 reciprocates, via the slipper 36 and wobbler 34, through the predetermined length of movement within each piston bore 26, while the cylinder block 14 rotates in conjunction with the shaft 12. In a preferred embodiment, the radius R of the extended curvature 56 should be of sufficient magnitude to provide continuous, tangential cooperation between the extreme portion $L_1$ of the piston 38 and the piston bore surface 32 of the cylinder block 14 within the predetermined length of movement in the piston bore 26.

The continuous, tangential cooperation is preferably of a conjugate nature, such that a rolling motion occurs between the piston 38 and the piston bore surface 32, as opposed to a sliding, discontinuous, non-uniform motion. This cooperation reduces wear on the piston bore surface 32 of the cylinder block 14, by reducing the Hertzian or contact stresses present from the "cocked" position of the piston 38 within the piston bore 26, as the piston 38 reciprocates and simultaneously rotates within the piston bore 26 of the cylinder block 14. While the instant invention contemplates a range of radial dimensions to achieve the desired wear reduction function, a radius R in the range of approximately 60" to 80" is preferred.

It should be noted the cooperative nature of the extended curvature 56 is distinct from the corner 60. The extended curvature provides advantageous tangential or rolling cooperation between the piston 38 and the piston bore surface 32; however, the corner 60 does not provide continuous, tangential cooperation, as explained by the problems presented in the background of the invention. Thus, even though the corner 60 may be rounded, discontinuous rubbing on the piston bore surface 32 will occur without the extended curvature 56.

A further embodiment of the instant invention may include the extended curvature continuing the entire length of the cylindrical member 42 from the first end 48 to the second end 52 of the piston 38. Such an extended curvature may include one radius of sufficient magnitude to provide continuous, tangential cooperation between the cylindrical member 42 of the piston 38 and the piston bore surface 32 within the piston bore 26 to reduce wear on the piston bore surface 32.

Numerous modifications in the alternative embodiments of the invention will be apparent to those skilled in the art in view of the foregoing description. Accordingly, this description is to be construed as illustrative only and is for the purpose of enabling those skilled in the art to make and use the invention and teaching the best mode of carrying out the invention. The exclusive rights of all modifications which come within the scope of the appended claims is reserved.

I claim:

1. A piston for reciprocating and simultaneously rotating through a predetermined length of movement within a piston bore having a piston bore surface, the piston comprising:

a substantially cylindrical member having first and second extreme portions, a central portion and first and second ends, the central portion having a known length and a constant diameter over the known length, the first and second ends having equal known diameters, the first extreme portion extending from the first end to the central portion, the second extreme portion extending from the second end to the central portion, the first extreme portion having an extended curvature reducing the diameter of the cylindrical member from the diameter of the central portion to the diameter of the first end, the second extreme portion having an extended curvature reducing the diameter of the cylindrical member from the diameter of the central portion to the diameter of the second end, each extended curvature being convex in nature and providing continuous, tangential cooperation between the extreme portions of the cylindrical member and the piston bore surface within the predetermined length of movement to reduce wear on the piston bore surface, each extreme portion being equal in length and shorter than the central portion, the length of the central portion being less than the diameter of the first and second ends.

2. A cylinder block assembly rotatably coupled to a shaft for use in a pump, the cylinder block assembly comprising:

a cylinder block having a plurality of piston bores extending therethrough, each piston bore having a piston bore surface;

a wobbler adjacent to the cylinder block;

at least one slipper coupled to the wobbler for providing reciprocating movement of at least one piston through a predetermined length of movement within one of the piston bores of the cylinder block; and at least one piston coupled to the slipper for reciprocating and simultaneously rotating through the predetermined length of movement within one of the piston bores of the cylinder block, the piston having first and second extreme portions, a central portion and first and second ends, the central portion having a known length and a constant diameter over the known length, the first and second ends having known diameters, the first extreme portion extending from the first end to the central portion, the second extreme portion extending from the second end to the central portion, the first extreme portion having an extended curvature reducing the diameter of the piston from the diameter of the central portion to the diameter of the first end, the second extreme portion having an extended curvature reducing the diameter of the piston from the diameter of the central portion to the diameter of the second end, each extended curvature being convex in nature providing continuous, tangential cooperation between the extreme portions of the piston and the piston bore surface within the predetermined length of movement to reduce wear on the piston bore surface of the cylinder block, each extreme portion being equal in length and shorter than the central portion, the length of the central portion being less than the diameter of the first and second ends.

* * * * *